No. 631,123. Patented Aug. 15, 1899.
T. F. NORRIS.
DEHORNER.
(Application filed Mar. 29, 1899.)
(No Model.) 2 Sheets—Sheet 1.

WITNESSES:
Franck L. Ourand.
Esther V. Byng.

INVENTOR:
Thomas F. Norris
BY
Luis Baggu & Co.
ATTORNEYS.

THE NORRIS PETERS CO., PHOTO-LITHO., WASHINGTON, D. C.

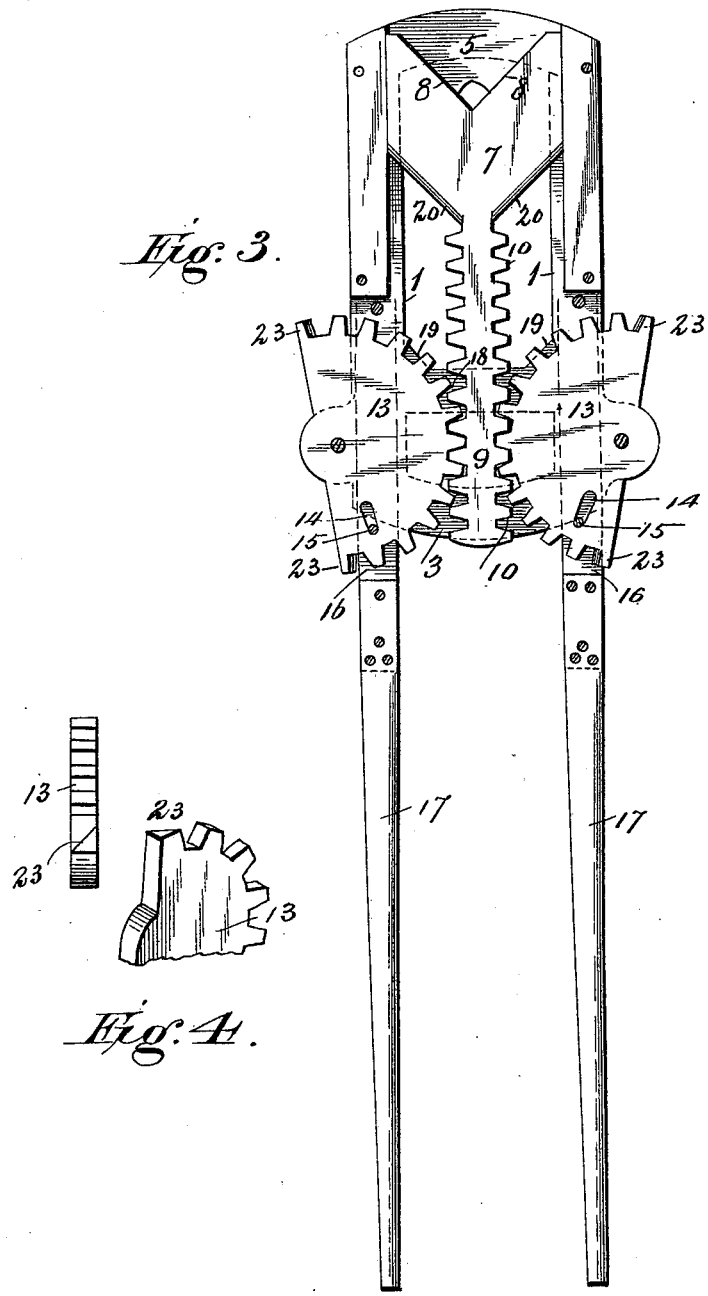

UNITED STATES PATENT OFFICE.

THOMAS F. NORRIS, OF ADAMS COUNTY, OHIO.

DEHORNER.

SPECIFICATION forming part of Letters Patent No. 631,123, dated August 15, 1899.

Application filed March 29, 1899. Serial No. 711,006. (No model.)

*To all whom it may concern:*

Be it known that I, THOMAS F. NORRIS, a citizen of the United States, residing in the county of Adams and State of Ohio, have invented new and useful Improvements in Devices for Dehorning Cattle, of which the following is a specification.

My invention relates to tools principally designed for dehorning cattle, but which may also be used for cutting fence-wires or bolts, thus rendering it a handy and valuable device for use upon a farm.

The invention consists in the novel construction and combination of parts hereinafter fully described and claimed.

Figure 1:
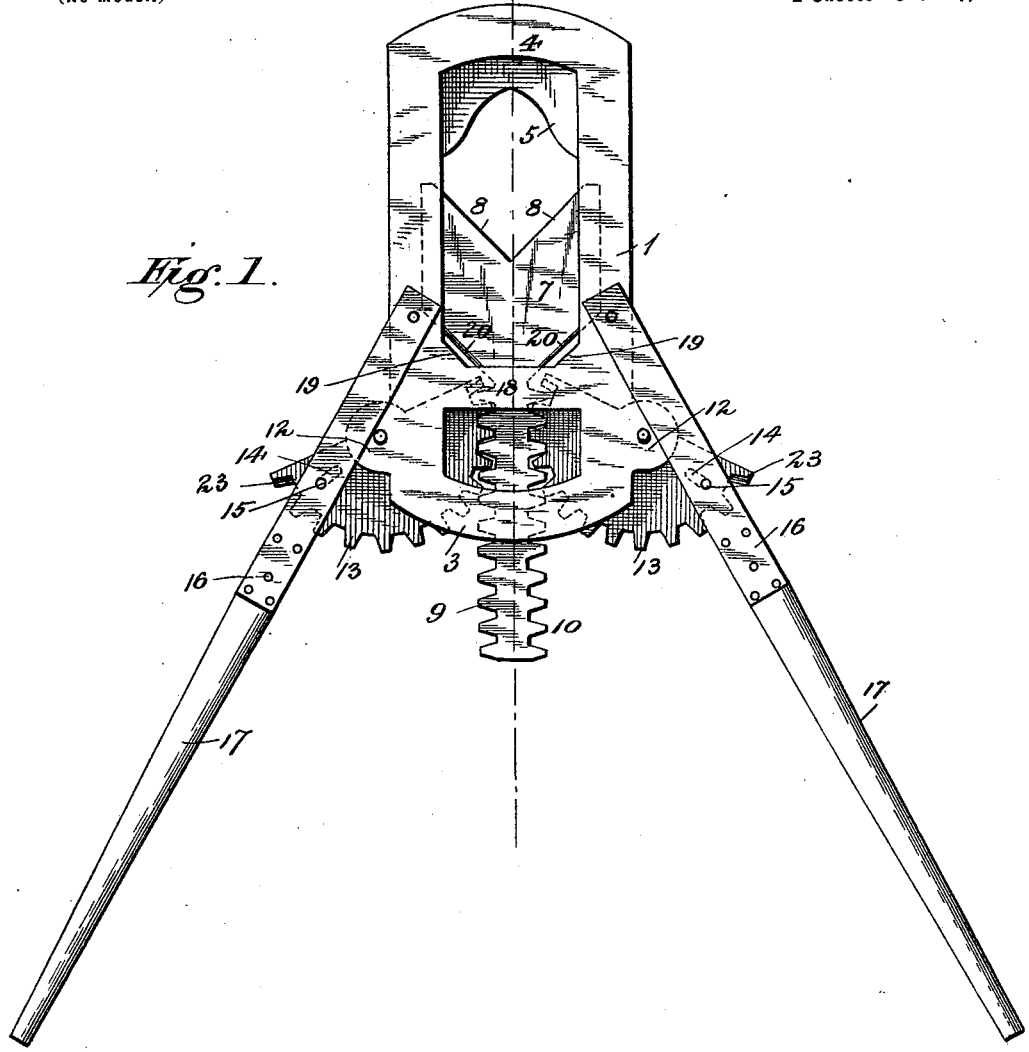
Figure 2:
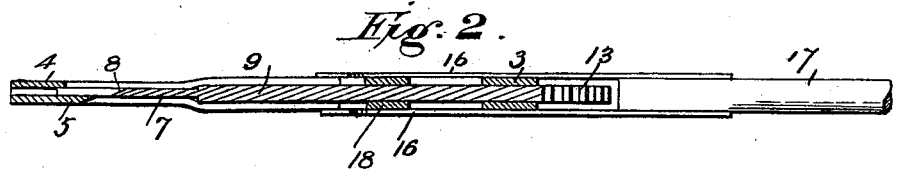

In the accompanying drawings, Figure 1 is an elevation of a tool constructed according to my invention. Fig. 2 is a central vertical section of the same. Fig. 3 is a view similar to Fig. 1, one of the side plates being removed and the handles shown contracted. Fig. 4 is a detail view.

In the said drawings the reference-numeral 1 designates an open frame comprising two side bars connected together at the lower ends by cross-bars 3 and at the upper end by cross-bars 4, one of which is formed with an extension 5, provided with a curved recess forming a cutting edge.

The numeral 6 designates two side bars to which said plates are secured. Working in the spaces between said side plates is a cutter 7, formed with a triangular cutting edge 8 and with a shank 9, provided with opposite rack-teeth 10. Pivoted to lugs 12, formed with said side plates are cogged segments 13, which engage with the racks of said shank. These segments are formed with slots 14, through which project pins 15, secured to bars 16, pivoted to said side plates, and to which are secured handles 17, by means of which the said cutter is operated by contracting and expanding the handles. The numeral 18 designates cross-bars connected with said side plates, the upper ends of which are inclined and sharpened, forming cutting edges 19. The lower end of the said cutter is also inclined and sharpened, forming coinciding cutting edges 20. The outer cogs of the said pivoted segments are cut away or beveled, forming cutting edges 23, which coincide with cutting edges formed at the outer edges of the bars 16.

In using the tool for dehorning cattle the horns are inserted between the cutter 7 and the cutting edge of the extension 5, and by now bringing the handles together the horn will be cut off in a rapid and efficient manner.

The cutting edges 19 and 20 are for the purpose of cutting bolts, while the cutting edges of the cogs of the segments and the bars to which the handles are secured may be employed for cutting fence or other wires.

From the above it will be seen that I provide a very useful article for use on a farm which may be employed for a number of purposes.

Having thus fully described my invention, what I claim is—

1. The combination with the open frame formed with slots near the lower end, the extension formed with a stationary curved cutting edge, the movable cutter formed with a triangular cutting edge and the shank provided with opposite rack-teeth, of the pivoted cog-segments formed with slots, the bars pivoted to said frame provided with pins working in the slots of said segments, and the handles secured to said bars, substantially as described.

2. As an improved article, a combination-tool comprising the open frame having an extension formed with a cutting edge, the movable cutter having inclined cutting edges at the lower end, the cross-bar connected with said frame, formed with corresponding cutting edges, the shank provided with opposite rack-teeth, the pivoted cog-segments formed with slots and the outer cogs formed with cutting edges, the pivoted handles formed with coinciding cutting edges, the pins secured to said bars, and the handles, substantially as described.

In testimony whereof I have hereunto set my hand in presence of two subscribing witnesses.

THOMAS F. NORRIS.

Witnesses:
D. S. CLARK,
GEO. T. WILLIM.